US011231271B2

(12) United States Patent
Suchowski et al.

(10) Patent No.: US 11,231,271 B2
(45) Date of Patent: Jan. 25, 2022

(54) INTERFEROMETER SYSTEM AND APPLICATION THEREOF

(71) Applicant: Technology Innovation Momentum Fund (Israel) Limited Partnership, Tel-Aviv (IL)

(72) Inventors: Haim Suchowski, Kfar Mordechai (IL); Erga Lifshitz, Tel-Aviv (IL); Assaf Levanon, Tel Aviv (IL); Michael Mrejen, Tel Aviv (IL)

(73) Assignee: Technology Innovation Momentum Fund (Israel) Limited Partnership, Tel-Aviv (IL)

( * ) Notice: Subject to any disclaimer, the term of this patent is extended or adjusted under 35 U.S.C. 154(b) by 0 days.

(21) Appl. No.: 16/761,843

(22) PCT Filed: Nov. 6, 2018

(86) PCT No.: PCT/IL2018/051188
§ 371 (c)(1),
(2) Date: May 6, 2020

(87) PCT Pub. No.: WO2019/087201
PCT Pub. Date: May 9, 2019

(65) Prior Publication Data
US 2021/0199419 A1   Jul. 1, 2021

Related U.S. Application Data

(60) Provisional application No. 62/581,800, filed on Nov. 6, 2017.

(51) Int. Cl.
*G01B 9/02* (2006.01)
*G01J 3/02* (2006.01)
*G01J 3/453* (2006.01)

(52) U.S. Cl.
CPC ..... *G01B 9/02044* (2013.01); *G01B 9/02028* (2013.01); *G01J 3/0208* (2013.01);
(Continued)

(58) Field of Classification Search
CPC ............ G01J 3/4532; G01J 2003/4534; G01B 9/02028; G01B 9/02044; G01B 2290/35; G01B 2290/70
See application file for complete search history.

(56) References Cited

U.S. PATENT DOCUMENTS 3,528,719 A   9/1970 Brooks
6,115,121 A   9/2000 Erskine
(Continued)

FOREIGN PATENT DOCUMENTS

WO   WO 2019/087201   5/2019

OTHER PUBLICATIONS

Herriott, D. et al. "Off-Axis Paths in Spherical Mirror Interferometers". Applied Optics, vol. 3, No. 4, Apr. 1964, pp. 523-526. (Year: 1964).*
(Continued)

*Primary Examiner* — Michael A Lyons

(57) ABSTRACT

An interferometer system comprises a light redirecting system for splitting an input light beam into two secondary light beams to respectively propagate along a first optical arm and a second optical arm, and for recombining the secondary light beams after exiting the optical arms. The interferometer system also comprises a multipass optical cell positioned at the second optical arm for effecting a predetermined optical path length within the second arm.

17 Claims, 14 Drawing Sheets

(52) U.S. Cl.
CPC ........ *G01J 3/4532* (2013.01); *G01B 2290/35* (2013.01); *G01B 2290/70* (2013.01)

(56) References Cited

U.S. PATENT DOCUMENTS

| | | | |
|---|---|---|---|
| 10,041,781 B1* | 8/2018 | Tucker | G01B 9/02019 |
| 2003/0016901 A1 | 1/2003 | Cormack | |
| 2006/0098204 A1 | 5/2006 | Kenda et al. | |
| 2009/0122383 A1* | 5/2009 | Reyes | G01J 3/4535 359/238 |
| 2013/0050704 A1 | 2/2013 | Padilla Viquez | |
| 2013/0193325 A1* | 8/2013 | Phillips | G01N 21/3504 250/339.07 |
| 2015/0260695 A1* | 9/2015 | Spartz | G01N 30/8606 250/339.01 |
| 2016/0003606 A1 | 1/2016 | Okano et al. | |

OTHER PUBLICATIONS

Wei, Ruyi et al. "Designs of multipass optical configurations based on the use of a cube corner retroreflector in the interferometer". Applied Optics, vol. 50, No. 12, Apr. 20, 2011, pp. 1673-1681. (Year: 2011).*

Nwaboh, Javis Anyangwe et al. "Optical Path Length Calibration: A Standard Approach for Use in Absorption Cell-Based IR-Spectrometric Gas Analysis". International Journal of Spectroscopy, vol. 2014, Article ID 132607, Jul. 17, 2014, pp. 1-9. (Year: 2014).*

International Search Report and the Written Opinion dated Feb. 19, 2019 From the International Searching Authority Re. Application No. PCT/IL2018/051188. (10 Pages).

Adler et al. "Mid-Infrared Fourier Transform Spectroscopy with a Broadband Frequency Comb", OSA Publishing, Optics Express,18(21): 21861-21872, 2010.

Supplementary European Search Report and the European Search Opinion dated Jul. 9, 2021 From the European Patent Office Re. Application No. 18872648.3. (10 Pages).

Antonsen et al. "Herriott Cell Augmentation of a Quadrature Heterodyne Interferometer", Review of Scientific Instruments, XP012040419, 74(1): 88-93, Jan. 2003.

Zhang et al. "Application of Frequency Combs in the Measurement of the Refractive Index of Air", Review of Scientific Instruments, XP012093199, 77(8): 083104-1-083104-5, Published Online Aug. 7, 2006.

* cited by examiner

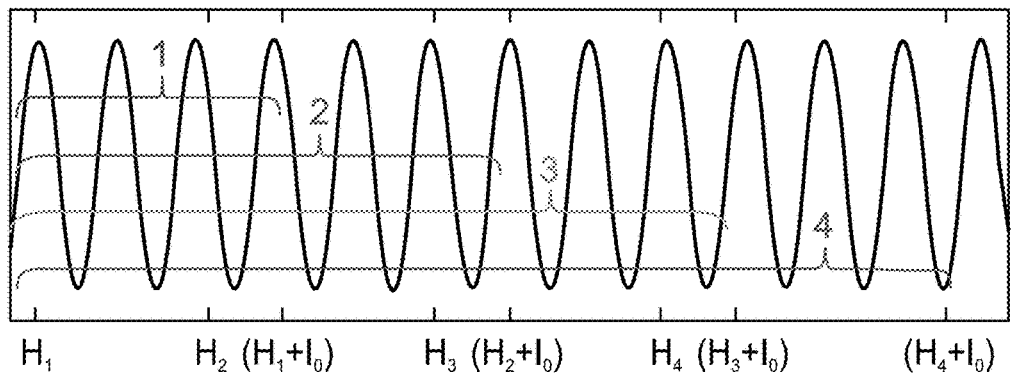
FIG. 2C
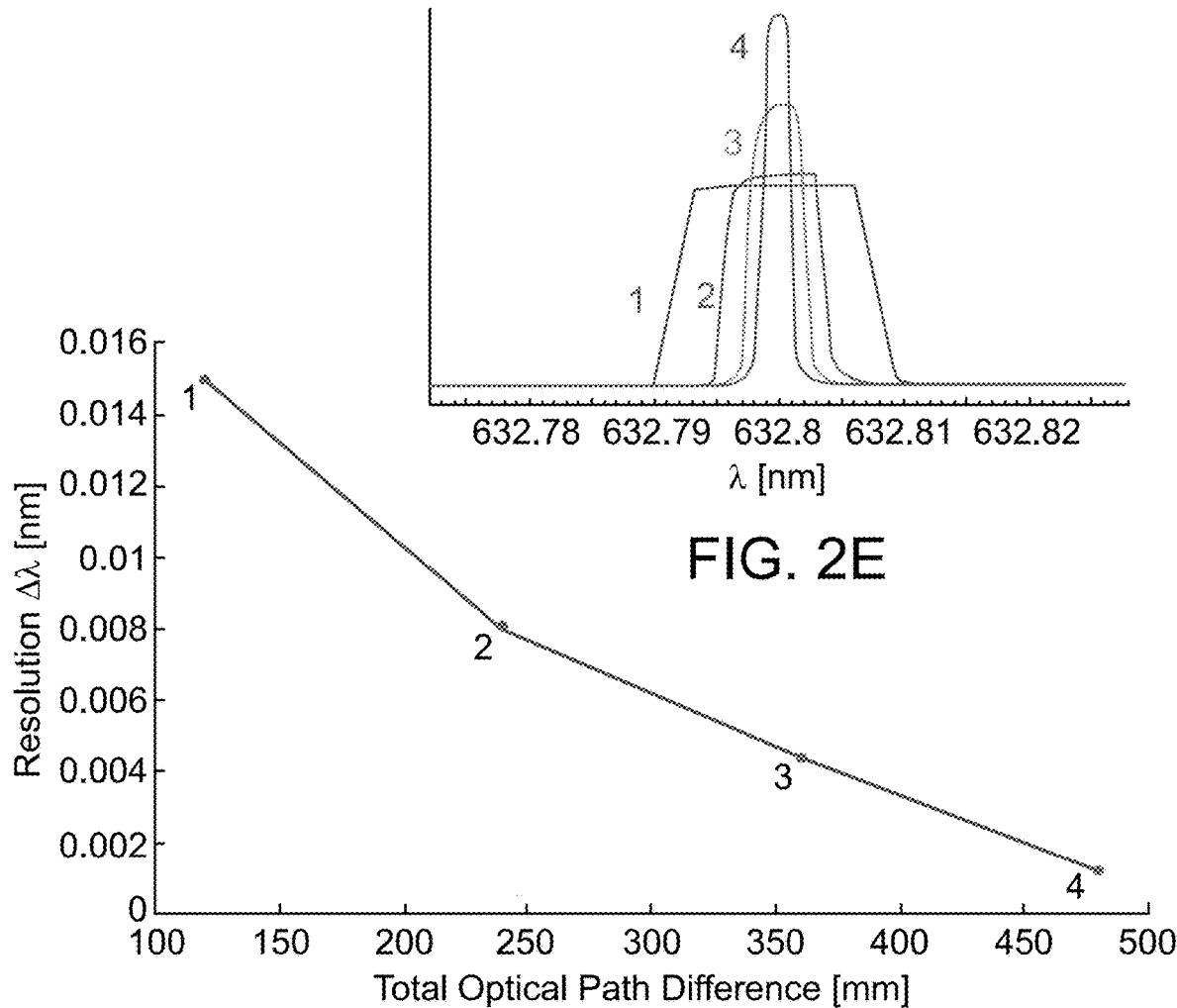
FIG. 2E
FIG. 2D

INTERFEROMETER SYSTEM AND APPLICATION THEREOF

RELATED APPLICATIONS

This application is a National Phase of PCT Patent Application No. PCT/IL2018/051188 having International filing date of Nov. 6, 2018, which claims the benefit of priority under 35 USC § 119(e) of U.S. Provisional Patent Application No. 62/581,800 filed on Nov. 6, 2017. The contents of the above applications are all incorporated by reference as if fully set forth herein in their entirety.

FIELD AND BACKGROUND OF THE INVENTION

The present invention, in some embodiments thereof, relates to interferometry and, more particularly, but not exclusively, to an interferometer system and application thereof, such as, but not limited to, FTIR spectroscopy.

Optical interference is widely used in interferometers such as the Michelson interferometer, the Mach-Zender interferometer, the Twyman-Greene interferometer, the Sagnac interferometer, and others. Generally, an interferometer divides incident light into two or more beams traveling along different paths, which are then recombined. An optical path difference is developed between the paths, resulting in constructive or destructive interference, depending on the wavelength of light and on the optical path difference (OPD). The intensity pattern resulting from this interference is termed an interferogram. By observing the interferogram while varying the path difference, the wavelength or wavelength components of the incident beam can be determined. The achievable spectral resolution depends on the arm-length and accuracy of the interferometer.

For example, a typical Michelson interferometer includes a beam splitter that divides the input light into two beams, a reflected beam and a transmitted beam. One of the beams is directed to a stationary mirror and is reflected thereby. The other beam is directed to a movable mirror and is reflected thereby. The two beams are then recombined by the beam splitter and enter a detector where interference fringes are formed due to the difference between the optical paths of the beams. The movable mirror is moved in a direction toward and away from the beam splitter, so that interference fringes vary with this motion. The detector produces a signal which describes the interferogram, and the Fourier transform is typically applied to this signal to retrieve spectral information.

An interferometer can be used for non-invasive characterization of materials, monitoring of chemical reactions and processes, and the like. For example, in a technique known as Fourier Transform Infra-Red (FTIR) spectrometry an interferogram of an infrared signal passed through a sample is collected and Fourier transformed to obtain, for example, a characteristic absorption and/or emission spectrum.

SUMMARY OF THE INVENTION

According to an aspect of some embodiments of the present invention there is provided an interferometer system. The interferometer system comprises: a light redirecting system for splitting an input light beam into two secondary light beams to respectively propagate along a first optical arm and a second optical arm, and for recombining the secondary light beams to a combined beam after exiting the optical arms; and a multipass optical cell positioned at the second optical arm and being configurable to effect a predetermined optical path length within the second arm.

According to an aspect of some embodiments of the present invention there is provided a spectrometer system. The spectrometer system comprises: a light redirecting system for splitting an input light beam into two secondary light beams to respectively propagate along a first optical arm and a second optical arm, and for recombining the secondary light beams to a combined beam after exiting the optical arms; wherein the second optical arm is configurable to assume a state selected from a set of states, each state corresponding to a different path length within the second arm; and wherein the first optical arm is configured to scan, for each state of the second optical arm, an optical path difference between an optical path length of the first arm and an optical path length corresponding to the state of the second optical arm.

According to some embodiments of the system comprises a light detector for receiving the combined beam and generating a signal indicative of an interference pattern encoded in the combined beam.

According to some embodiments of the invention the system comprises a signal processor configured for receiving from the light detector a plurality of time-varying signals, each corresponding to a scan of the first optical arm for a different state of the second optical arm, and combining the signals.

According to some embodiments of the invention the system wherein the multipass optical cell is a Herriott cell. According to some embodiments of the invention the system wherein the multipass optical cell is White cell.

According to some embodiments of the invention the first optical arm is configured to scan an optical path difference between the predetermined optical path length and an optical path length of the first optical arm.

According to some embodiments of the invention the optical arms and light redirecting system are arranged to form a Michelson interferometer.

According to some embodiments of the invention the optical arms and light redirecting system are arranged to form a Sagnac interferometer.

According to some embodiments of the invention the optical arms and light redirecting system are arranged to form a Mach-Zehnder interferometer.

According to some embodiments of the invention the optical arms and light redirecting system are arranged to form a Polarimetric interferometer.

According to an aspect of some embodiments of the present invention there is provided an FTIR spectrometer system. The FTIR spectrometer system comprises the interferometer system as delineated hereinabove and optionally and preferably as further detailed hereinbelow.

According to an aspect of some embodiments of the present invention there is provided a method of analyzing a light beam. The method comprises passing the light beam through the interferometer system and analyzing an output of the detector.

According to some embodiments of the invention the method comprises reconfiguring the multipass optical cell to effect a different predetermined optical path length within the second arm, wherein the analyzing the output comprises combining signals corresponding to different optical path length ranges within the second arm.

According to some embodiments of the invention the signals are combined by matching phase shifts between the signals, and concatenating the signals at the matched phase shifts.

According to some embodiments of the invention the phase shifts comprise spatial phase shifts. According to some embodiments of the invention the phase shifts comprise spectral phase shifts.

According to some embodiments of the invention the signals are combined by adjusting amplitudes of the signals.

According to some embodiments of the invention the signals are combined by sorting the signals according to the optical path length ranges, to provide an ordered list of signals, and iteratively combining each signal of the ordered list to an adjacent signal of the list.

According to some embodiments of the invention the method comprises re-arranging the list such as to ensure overlapping optical path length ranges among at least two adjacent signals of the list.

According to some embodiments of the invention the light beam comprises infrared light.

According to some embodiments of the invention the light beam comprises visible light.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-E are schematic illustrations of principles of operation of the interferometer system according to some embodiments of the present invention;

DESCRIPTION OF SPECIFIC EMBODIMENTS OF THE INVENTION

Figure 1A:
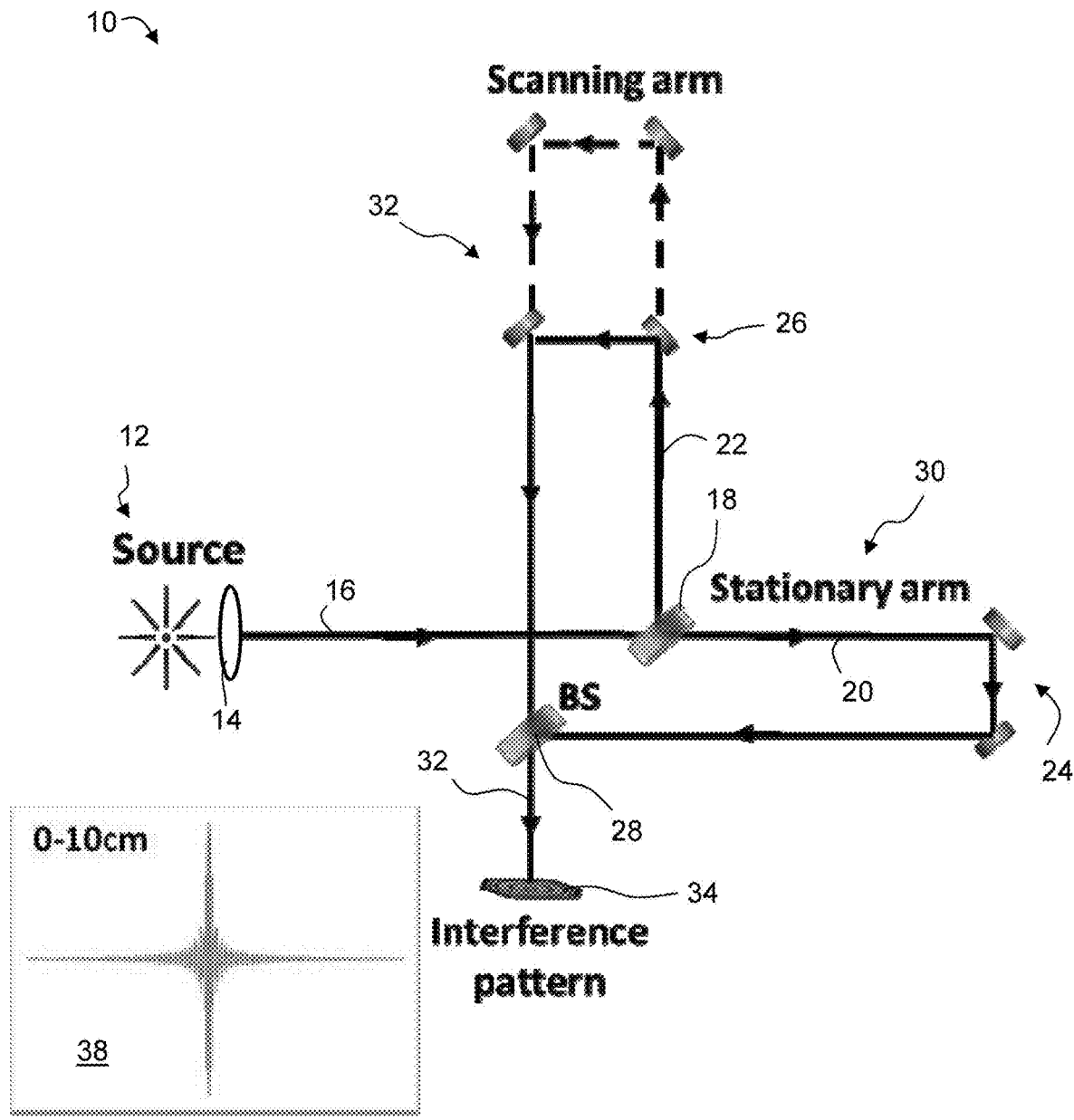
FIG. 1A is a schematic illustration of an exemplary FTIR spectrometer which is based on a Michelson interferometer.

The present invention, in some embodiments thereof, relates to interferometry and, more particularly, but not exclusively, to an interferometer system and application thereof, such as, but not limited to, FTIR spectroscopy.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments comprise an interferometer system, which is optionally and preferably compact, broadband and provide high resolution. The interferometer system can be used for generating interference patterns of visible or infrared light. In some embodiments of the present invention the interferometer system serves as, or is be part of, a spectrometer, such as, but not limited to, an FTIR spectrometer.

For purposes of better understanding some embodiments of the present invention, reference is first made to the construction and operation of an exemplary FTIR spectrometer 10 which is based for example on a Michelson interferometer, as illustrated in FIG. 1A.

Using a radiation source 12 and an optical system 14 (e.g., one or more lenses) a parallel light beam 16 is produced. The beam 16 strikes a first beam splitter 18 (e.g., a semi-transparent mirror), splitting beam 16 into two secondary light beams 20 and 22. First secondary light beam 20 falls onto a positionally fixed reflective optical system 24 (e.g., a set of mirrors) and is reflected there. Second secondary light beam 22 falls onto a moveable reflective optical system 26 (e.g., a set of mirrors) and is reflected there. The two beams 20 and 22, once reflected, combined at a second beam splitter 28 at which they interfere with each other, forming a combined beam 32 constituting an interference pattern that can be detected by a detecting and measuring system (not shown). In use, a sample or sample chamber 34 can be placed, for example, at the light path of beam 32 to allow measuring the spectral characteristics of the sample by the detecting and measuring system.

The light path traversed by beam 22 between beam splitters 18 and 28 is referred to as the scanning arm 32 of spectrometer 10, and light path traversed by beam 20 between beam splitters 18 and 28 is referred to as the stationary arm 30 of spectrometer 10.

The interference between beams 20 and 22 is controlled in a deliberate fashion via the movement of the reflective optical system 26 at the scanning arm 32 of spectrometer 10. The motion of system 26 effects a time-varying optical signal, the variations in which may be detected by the measuring and detecting system providing a time-varying signal (typically electrical signal) known as an interferogram. This information can be analyzed by appropriate Fourier analysis to indicate the spectral characteristics of the sample 34.

A representative example of a graphical representation of an interferogram 38 generated by moving reflective optical system 26 over a distance of 0-10 cm (as measured from the closest point of system 26 to beam splitter 18) at is shown at the inset of FIG. 1A.

It is recognized that the resolution of a spectrometer utilizing utilizes an interferometer, such as, for example, the Michelson interferometer employed in the FTIR spectrometer 10, is proportional to the inverse of the largest optical path difference (OPD) of the interferometer (e.g., the largest OPD between arms 32 and 30 of FTIR spectrometer 10). The present inventors discovered a technique that can achieve long OPD in a compact packaging, therefore making high spectral resolution amenable to spatially constrained systems.

In particular, the inventors discovered that spectroscopy resolution can be significantly enhanced by modifying the spectrometer in a manner that stationary arm 30 is configurable so that it can assume a set (e.g., a discrete set) of states, each corresponding to a different optical path length within arm 30. With such configuration, rather than recording a single time-varying signal, as done by spectrometer 10, the spectrometer can record a plurality of time-varying signals, each corresponding to the variation of the optical path length within the scanning arm 32 (for example, by movement of the moving reflective optical system 26) over a range of optical path lengths (e.g., over the same range of path lengths), but for a different state of arm 30 that remains stationary during the variation.

Thus, denoting the range of available path lengths within arm 32 by $[a_1, a_2]$ and the set of distances that correspond to the configurable states of arm 30 by $b_1, b_2, \ldots, b_N$, where $b_1 < b_2 < \ldots < b_N$, the modified spectrometer can be used, for example, to record N time-varying signals, respectively corresponding to the following N different OPD ranges: $[a_1-b_1, a_2-b_1], [a_1-b_2, a_2-b_2], \ldots, [a_1-b_N, a_2-b_N]$. The inventors found that such N time-varying signals can be processed and combined to provide a signal that describes a synthetic interferogram which is longer than the interferogram described by each individual signal recorded by the modified spectrometer. In other words, the synthetic interferogram corresponds to an OPD range that is larger than any of the individual OPD ranges, and therefore provide a higher resolution. Using the above notation, the N time-varying signals can be processed and combined to provide a signal that describes a synthetic interferogram corresponding to the OPD range of $[a_1-b_N, a_1-b_1]$. Since $b_N > b_1$, this range is wider than each individual OPD range.

The spectrometer of the present embodiments enjoys many advantages. One advantage is the ability to achieve resolution beyond known laboratory equipment. For example, presently known commercial FTIR spectrometers have an OPD of about 5 meters, and require large space to be deployed (the size of a room). The spectrometer of the present embodiments can achieve the same or higher OPD using a set of states of the stationary arm, with much smaller OPD scans. For example, using 13 states and OPD scan of 40 cm per state can provide effective OPD of at least 5.2 meters. Since the OPD scans are only 40 cm, the size of the spectrometer is much smaller (tabletop size).

Another advantage is that the spectrometer of the present embodiments can be made portable with higher resolution than commercially available portable spectrometers. Since the resolution is increased with the number of states of the stationary arm, the portable spectrometer of the present embodiments can have ten or more states thus achieving a resolution that is at least an order-of-magnitude higher than the same portable spectrometer without configurable stationary arm. Such high-resolution portable spectrometers are particularly useful in the nano-satellite industry, where one has limited space, but desire to have high spectral resolution.

A configurable stationary arm can be embodied in more than one way. In some embodiments of the present invention the reflective optical system 24 can be made position-adjustable, so that each state of the stationary arm corresponds to a different position of reflective optical system 24. In some embodiments of the present invention a multipass optical cell having a plurality of optical path modes can be placed in the optical path of the stationary arm.

A multipass optical cell, as used herein, refers to an optical device that is capable of extending the optical path of a beam of light passing inside it.

A multipass optical cell having a plurality of optical path modes, as used herein, refers to an optical device that is capable of extending the optical path of a beam of light passing inside it, wherein the extent of the extension is selectable out of a range of optical path extensions.

Some embodiments of the invention provide an interferometer that comprises a multipass optical cell positioned at one of the optical arms of the interferometer.

Figure 1B:
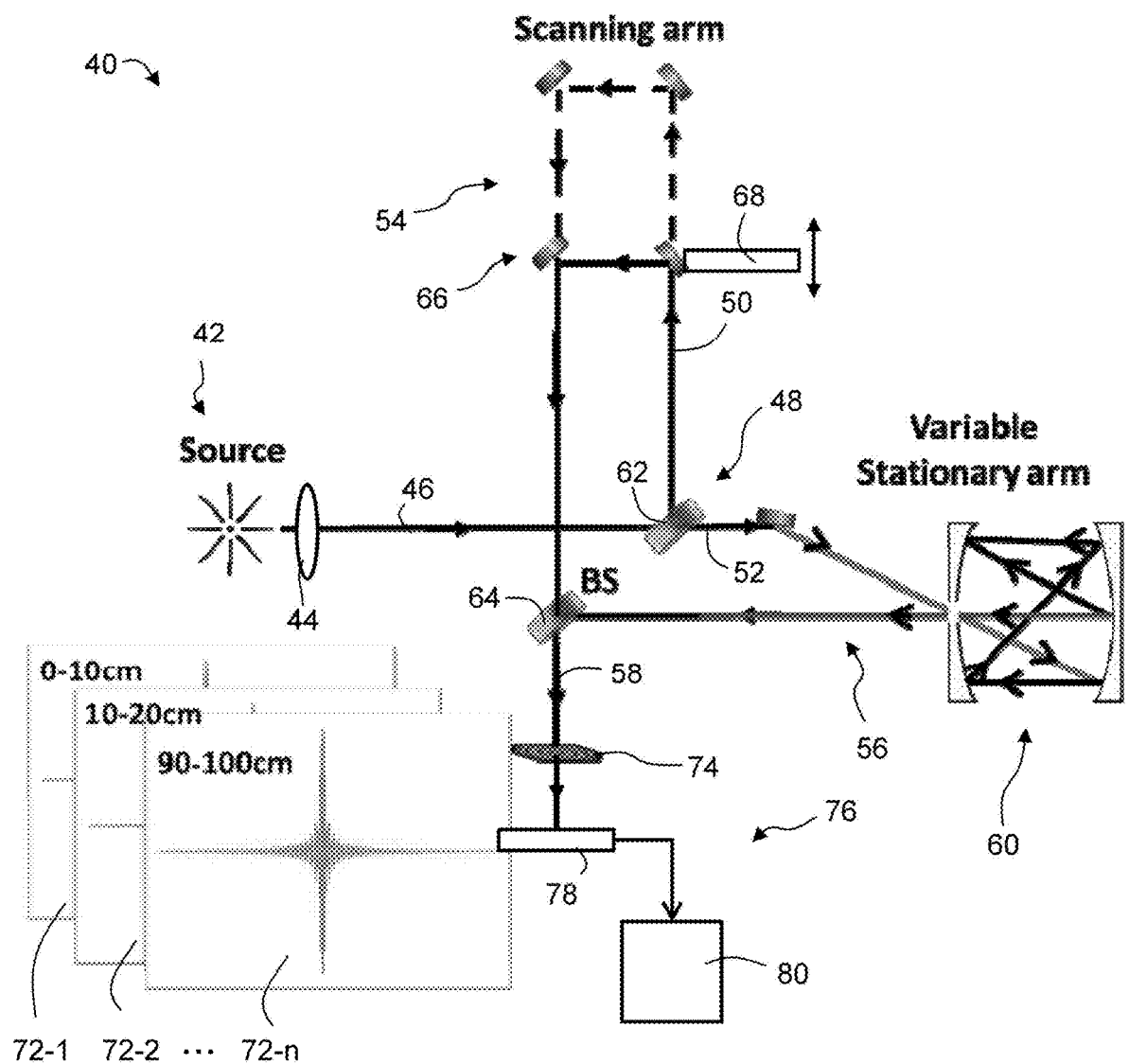
FIG. 1B is a schematic illustration of an interferometer system, according to some embodiments of the present invention.

FIG. 1B illustrates an interferometer system 40, according to some embodiments of the present invention. System 40 optionally and preferably comprises a collimator 44 that collimates light generated by a light source 42 to provide a collimated light beam 46. Collimator 44 can be, for example, a collimating lens. System 40 can also comprise a light redirecting system 48 for splitting light beam 46 into two secondary light beams 50 and 52 to respectively propagate along a first optical arm 54 and a second optical arm 56, and also for recombining the secondary light beams 50 and 52 to a combined beam 58 after exiting the optical arms 54 and 56. Light redirecting system 48 can be embodied, for example, as a first beam splitter 62 that splits beam 46 into beams 50 and 52, and a second beam splitter 64 that recombines beams 50 and 52 into beam 58.

The optical arms and light redirecting system 48 of system 40 are optionally and preferably arranged to form a Michelson interferometer, as illustrated in FIG. 1B. However, this need not necessarily be the case, since, for some applications, it may not be necessary for interferometer system 40 to be of the Michelson. For example, in some embodiments of the present invention the optical arms and light redirecting system are arranged to form a Sagnac interferometer, or a Mach-Zehnder interferometer, or a Polarimetric interferometer or the Twyman-Green interferometer.

In a Mach-Zehnder interferometer, for example, the two optical arms are arranged so that the two beams propagate to form two halves of an optical loop so that the propagation direction of each beam is not reversed. In a Sagnac interferometer, the two optical arms are arranged to form an optical loop (also known as a Sagnac loop), wherein the two secondary beams propagate in a clockwise and a counter-clockwise directions within the loop. In a Twyman-Green interferometer, the sample or sample chamber is placed at one of the optical arms.

System 40 also comprises a multipass optical cell 60 positioned at one of the optical arms (the second optical arm 56, in FIG. 1B). In various exemplary embodiments of the invention multipass optical cell 60 is configurable to effect a predetermined optical path length within second arm 56.

The multipass optical cell of the present embodiments can be, for example, a Herriott cell or a White cell.

A Herriott cell provides two opposing end-mirrors that are arranged at opposite ends of a multipass cell cavity and are directed at one another. This ensures that a source light beam is caused to repeatedly bounce across the length of the cell cavity, directly from one end-mirror to the other end-mirror, and thereby increasing the effective path length each time the light beam undergoes another reflection at each end mirror. The special feature of Herriott cells is the possibility of obtaining an optical path for the beam of light which has significant length despite the availability of a cell with reduced dimensions. By positioning the two mirrors, for example spherical, at a predetermined distance from each other and with the concavities facing each other, it is possible to obtain multiple reflections of the beam of light between one mirror and the other. Consequently, the optical path completed by the beam in the cell is no longer equal only to the distance between the two mirrors, but rather equal to approximately the distance between the two mirrors multiplied by the number of reflections, or passes, that it completes in the cell.

A White cell differs from a Herriott cell in that the White cell instead typically utilizes a three mirror arrangement. Two smaller concave mirrors are arranged at a first end of the multipass cell cavity so as to oppose a larger concave mirror at the second end of the multipass cell cavity. In this case, a source light beam bounces across the length of the cell cavity directly between the first smaller end-mirror and the larger opposing mirror and then, across the length of the cell cavity, directly between the second smaller end-mirror and the larger opposing mirror, in a repeated so-called "V" pattern, before exiting. White cells find advantages with incoherent sources.

Other types of multipass optical cells, such as, but not limited to, a ring-down cavity, an astigmatic Herriott cell, a circular multipass cell, optical matrix system cell, and the like, are also contemplated.

The multipass optical cell 60 of the interferometer 40 of the present embodiments preferably has several distinct optical path modes that have a one to one nonlinear relation to the length of the cell. Such multipass optical cell 60 makes the arm at which it is embedded (the second optical arm 56, in FIG. 1B) configurable wherein each optical path mode defines a state of the arm since it provides a different path length within the arm. Selecting a mode of cell 60 (hence selecting a state of the respective arm) can be done, for example, by adjusting the distance and/or the relative angle between the end-mirrors of the cell. Use of a multipass optical cell having a plurality of optical path modes is advantageous since it allows reconfiguring the largest OPD of the interferometer, and therefore its resolution, without changing the dimensions of the system.

Preferably, but not necessarily, first optical arm 54 of system 40 is configured to scan an OPD between the predetermined optical path length set by cell 60 and the optical path length of first optical arm 54. These embodiments are particularly useful when interferometer system 40 is used for spectroscopy, e.g., FTIR spectroscopy.

OPD scan can be ensured, for example, by providing arm 54 with a moveable reflective optical system 66 (e.g., a set of mirrors) connected to a controllable stage 68 configured to move system 66, preferably along a direction parallel to beam 50. The movement of reflective optical system 66 ensures that a varying interference between beams 50 and 52, once combined by system 48, so that beam 58 constitutes a time-varying optical signal. In various exemplary embodiments of the invention, for any optical path mode of cell 60, spectrometer system 40 generates a different time-varying optical signal 58 via the movement of the reflective optical system 66 at arm 54.

Thus, by stepping through the optical path modes of multipass optical cell 60, interferometer system 40 of the present embodiments provides a plurality of combined beams 58, each constituting a different time-varying optical signal indicative of a different interferogram. Representative examples of graphical representations of n interferograms 72-1, 72-2, ..., 72-n generated by interferometer system 40 of the present is shown at the inset of FIG. 1B. Each of the n interferograms 72-1, 72-2, ..., 72-n is generated by moving reflective optical system 66 over a distance of the same range (0-10 cm, in the present example), but selecting a different optical path mode of cell 60. In the illustration shown in FIG. 1B, which is not to be considered as limiting, interferogram 72-1 corresponds to a configuration in which cell 60 that does not add to the OPD so that the effective OPD range remains 0-10 cm. Such a configuration can be realized by selecting a zero path length in cell 60 or by removing cell 60 from system 40. Interferogram 72-2 corresponds to a mode of cell 60 that adds 10 cm to the OPD so that the effective OPD range is 10-20 cm, and interferogram 72-n corresponds to a mode of cell 60 that adds 90 cm to the OPD so that the effective OPD range is 90-100 cm.

The (different) combined beams 58 can be directed, via a sample or sample chamber 74, to a detecting and measuring system 76, which optionally and preferably has a light detector 78 that receives the combined beams 58 and generates electrical signals indicative of the interference patterns encoded in the combined beams. System 76 preferably also comprises a signal processor 80 having an electronic circuit (preferably, but not necessarily, a dedicated electronic circuit) that receives and processes the signals from detector 78. In various exemplary embodiments of the invention the circuit of signal processor 80 having concatenates the signals to form a concatenated signal that is longer than each of the signals received from detector 78.

Preferably, the concatenated signal generated by signal processor 80 is indicative of an interferogram that is substantially equivalent to an interferogram that would have been obtained using an interferometer in which the largest OPD is larger (e.g., at least two times larger or at least three times larger or at least four times larger or at least five times larger or at least ten times larger) than the largest OPD obtainable by interferometer system 40 of the present embodiments in the absence of cell 60 (or, equivalently, the largest OPD obtainable by selecting a zero path length in cell 60). In the non-limiting example illustrated in FIG. 1B, the largest obtainable OPD of system 40 is 10 cm, and so the circuit of signal processor 80 is preferably configured to provide a concatenated signal that indicative of an interferogram that is substantially equivalent to an interferogram that would have been obtained using an interferometer in which the largest OPD is larger than 10 cm.

Typically, signal processor 80 processes the time-varying signals by finding and matching spatial and/or spectral phase shifts between the time-varying signals. The processing optionally and preferably includes matching the phase shifts of partly overlapping signals of different phase and magnitude, and concatenating the signals at the time-points within the signals in which matched phase shifts have been found.

Figure 2A:
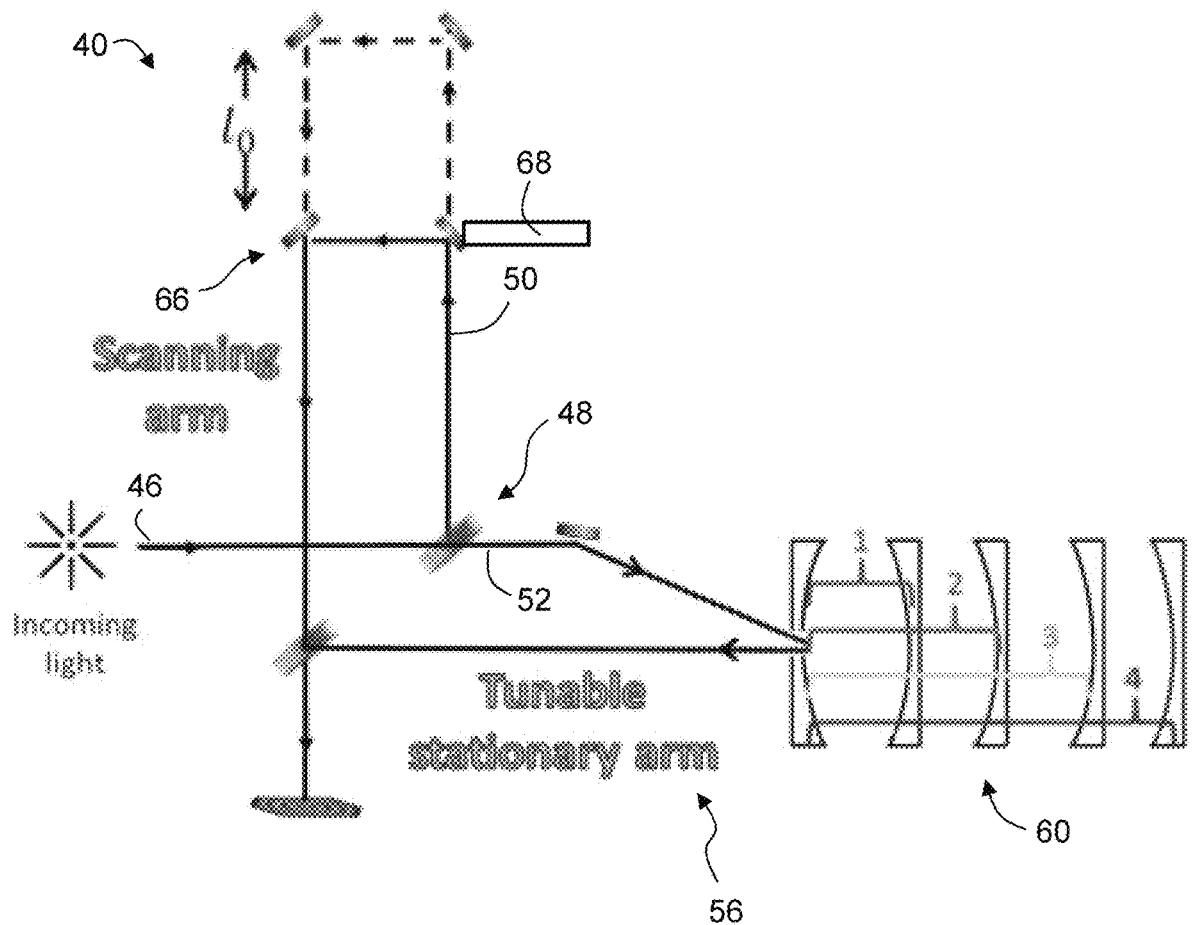
Figure 2B:
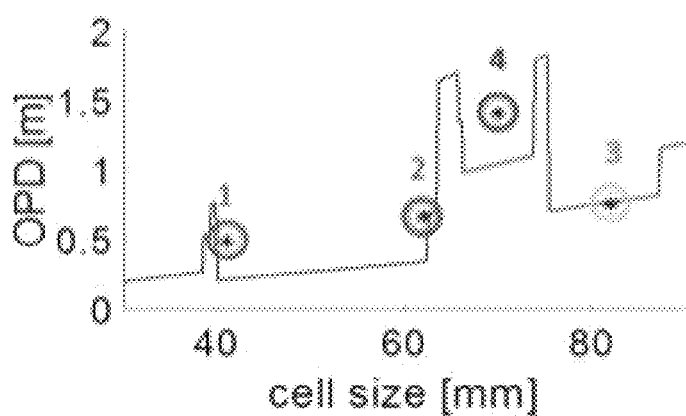

FIGS. 2A-E illustrates the principles of operation interferometer system 40 according to some embodiments of the present invention. In the illustrated embodiment, the longitudinal dimension of cell 60 is stepped and the OPD is varied for each step of the cell by scanning the length of the other arm (FIGS. 2A-B). This provides a set of interferograms, as illustrated in FIG. 2C. The interferograms are optionally and preferably combined by signal processor 80 (not shown, see FIG. 1B) and provide a high resolution spectrum (FIGS. 2D-E).

Figure 3A:
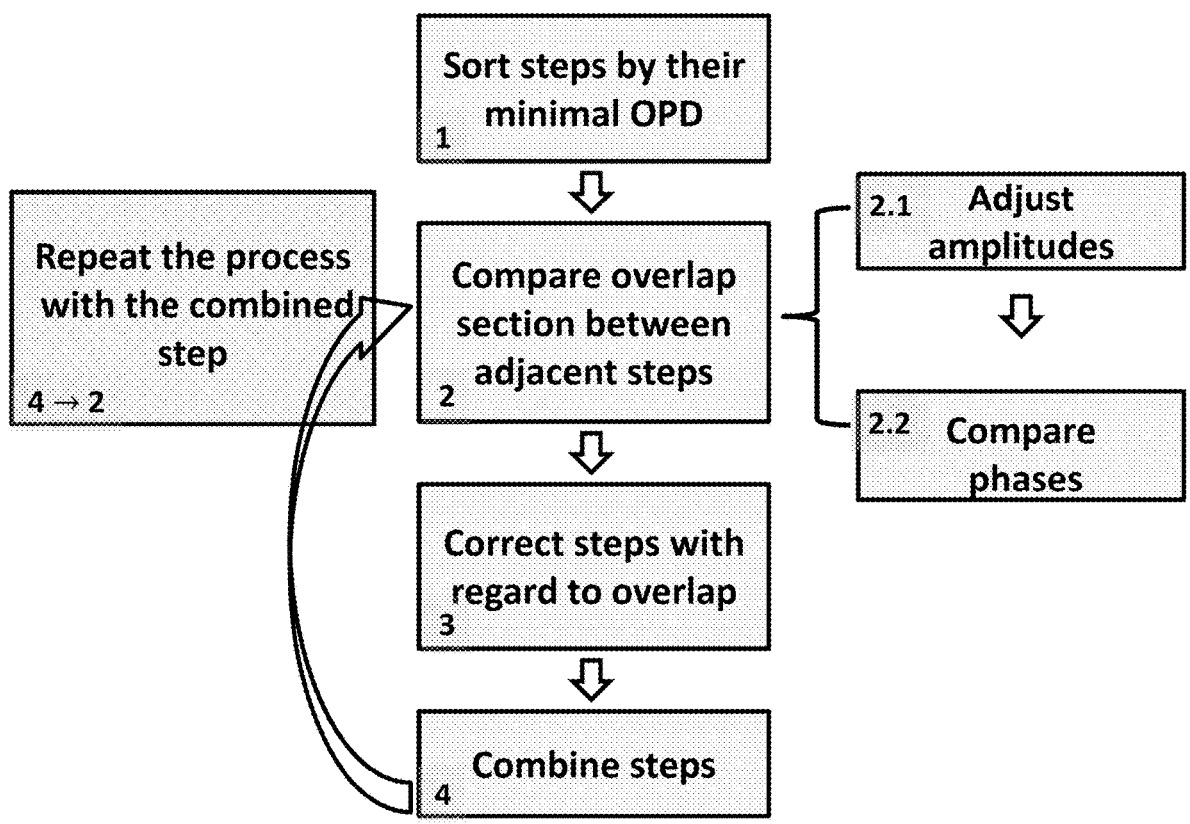
FIGS. 3A and 3B are flowcharts describing a representative example of a procedure suitable for concatenating time-varying signals, according to some embodiments of the present invention.
Figure 3B:
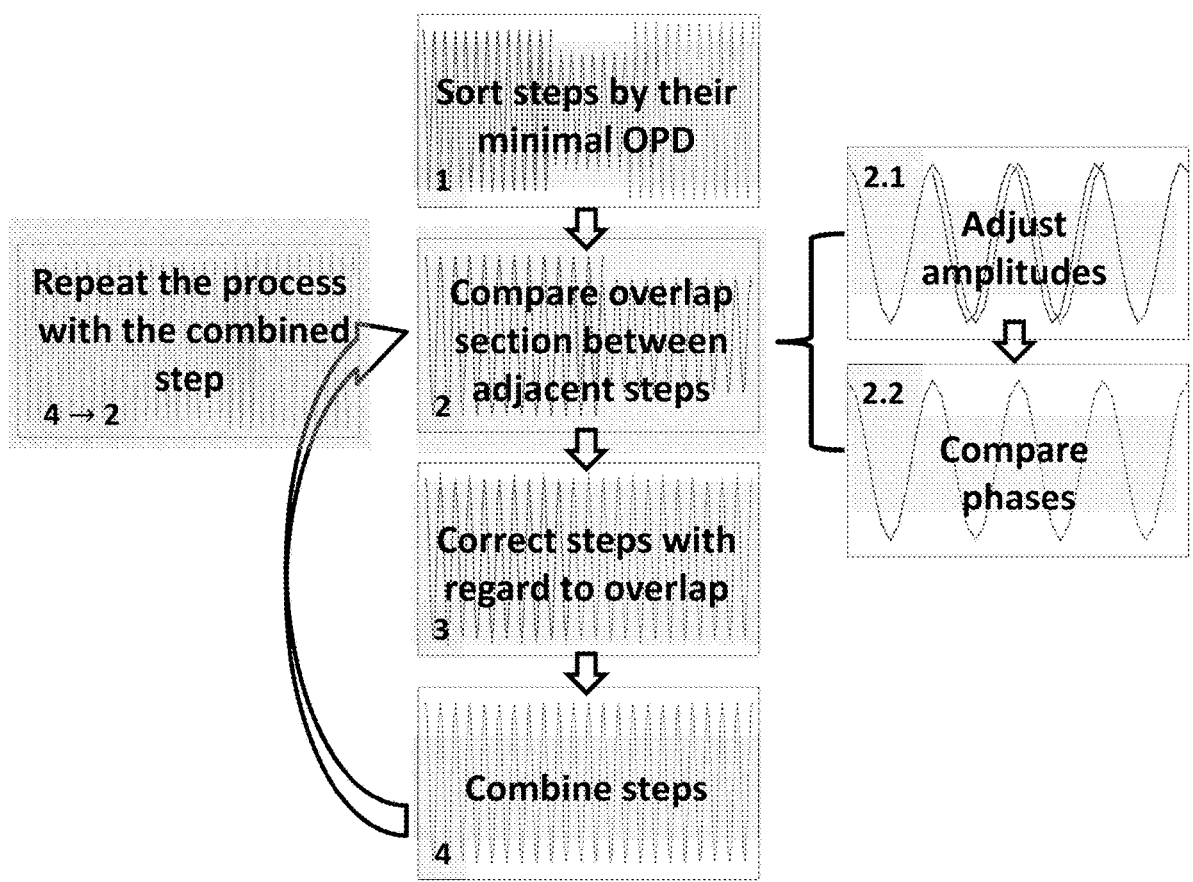

A representative example of a procedure suitable for concatenating the time-varying signals, according to some embodiments of the present invention will now be described, with reference to the flowcharts of FIGS. 3A-B, where FIG. 3B shows the same flowchart as FIG. 3A with further illustration of the effect of the various processing operations on the signals.

The process optionally and preferably begins at 1, at which the signals are sorted according to their minimal OPD, to provide an ordered list of signals. At 2, the process compares overlaps between adjacent signals. Typically, this is executed by adjusting the amplitudes of the signals 2.1 and/or comparing their phases 2.2. For example, signal processor 80 can match phase shifts between the signals. The phase shifts can be spatial and/or spectral phase shifts.

At 3 the signals are corrected with regard to the overlap portion, for example, by applying the adjusted amplitudes at the overlaps, and by matching the phases based on the phase shifts. The corrected signals can then be concatenated 4 at the matched phase shifts. Optionally and preferably, the signals are processed by a noise-reduction procedure prior to the concatenation at 4. In some embodiments of the present invention the process loops back to 2, for re-executing of the comparison of the overlap, the correction and the concatenation for the previously concatenated signals. In some embodiments of the present invention the list of signals is re-arranged such as to ensure overlapping optical path length ranges among two or more adjacent signals of the list.

Following is a description of a preferred concatenation process, in greater detail.

Preferably, the optical path modes of cell 60 that are used for generating the time-varying signals are selected to ensure that there is an overlap between the signals. A typical length of the overlap is from about 5% to about 25%, e.g., about 10%, but overlaps outside this range of overlaps are also contemplated. For example, a 10% overlap between two signals can be ensured by selecting the optical path modes of cell 60 such that the OPD ranges corresponding to the two signals have a 10% overlaps therebetween. Consider, as a representative example, that the OPD range of system 40 in the absence of cell 60 spans over 10 cm. In this case, a 10% overlap between two signals can be ensured by selecting a set of optical path modes for cell 60 that are multiples of 9 cm, resulting in interferograms that correspond to effective OPD ranges of 0-10, 9-19 cm, etc.

Once the time-varying signals are collected, they can be digitally represented as vectors, as follows:
Measurement Value size [1×K]
Measurement OPD size [1×K]
where K is the number of different scan steps performed by optical arm 54 (e.g., by means of controllable stage 68. Measurement Value size is a vector that stores the measured light intensities, and measurement OPD size is a vector that stores the corresponding OPDs. A representative value for K is from 10,000 to 1,000,000, e.g., about 500,000.

For N different optical path modes of cell 60 one has an array that stores all the different time-varying signals:
Measurement Value size [N×K]
Measurement OPD size [N×K].
A typical value for N is from about 5 to about 50, e.g., about 12.

Figure 4:
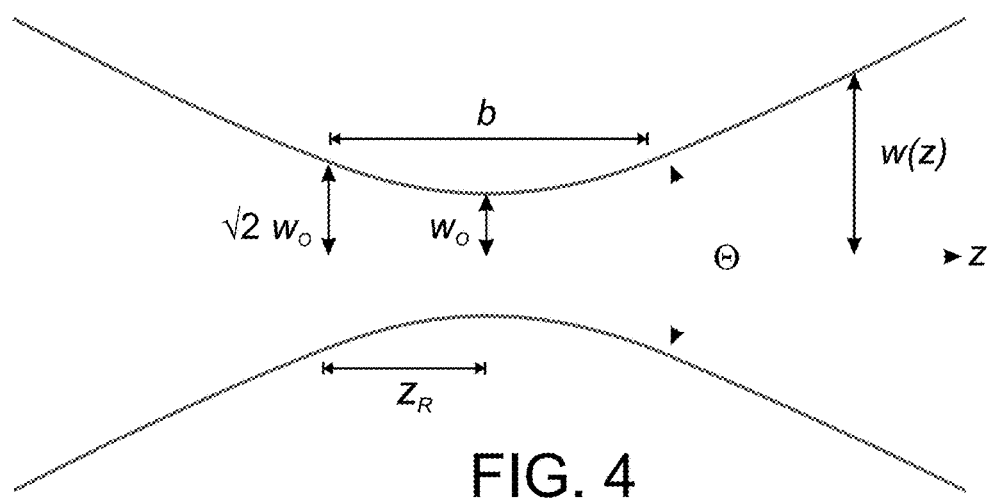
FIG. 4 is a schematic illustration showing a representative example of a gain for a Gaussian profile.

It is appreciated that the gain of each signal is not necessarily the same due to the differences in the optical path and the shape of the beam's profile. FIG. 4 shows a representative example of a gain for a Gaussian profile. In FIG. 4, $W_0$ is the initial width of the beam, $\Theta$ is asymptotic angle of the profile, Z is the distance from the center of the beam, W(Z) is the width as a function of the Z coordinate, $Z_R$ is the distance at which the square of the width increases by 2, $b=2Z_R$. Another cause for the gain difference is the shape of the pattern on the output which is connected to the optical path (typically circular). An additional cause is an attenuation of the beam, in a specific radius r, as a function of to distance. The power of a beam at distance r can be expressed as:

$$P(r, z) = P_0 \left[1 - e^{-\frac{2r^2}{w(z)}}\right]$$

where $P_0$ is the total output of the beam.

It is also appreciated that the there is a shift in the OPD caused by the shift of sampling of the respective signal, wherein starting positions of different signals may introduce errors to the value of the OPD. For a single signal, this shift can be neglected because it only adds a phase in the Fourier Transform (FT):

$$FT(x(t-t_0)) = e^{-j\sigma t_0} X(\sigma),$$

where $t_0$ is the shift of the signal in the acquisition phase, $X(\sigma)$ is the Fourier Transform of the (x(t)). Thus, each signal may have a different shift:

$$FT \left( \begin{cases} x(t) & t \in (t_1, t_2) \\ x(t+A) & t \in ((1-q)t_2, t_3) \\ x(t+B) & t \in ((1-q)t_3, t_4) \end{cases} \right)$$

where q is the overlap fraction (e.g., for a 10% overlap q equals 0.1 and 1−q equals 0.9).

To facilitate accurate calculation of the Fourier Transform, the signals are co-aligned. This can be done, as follows.

A running window averaging technique is applied to each signal, thus taking into consideration the gain differences. Thereafter, a fitting, such as, but not limited to, polynomial fitting is applied to each signal. The window averaging procedure can be formulated as:

$$rumMean(x) = \frac{\sum_{i \, in \left(x-\frac{C_1}{2},x+\frac{C_1}{2}\right)} segment(i)}{nIndexes}$$

where $C_1$ is the window size, and nIndexes is the total of segments in the summation.

A fit can be applied to the obtained rumMean vector. For example, for polynomial fitting, of a second degree, the following equation can be solved:

$$\begin{pmatrix} OPD(1)^2 & OPD(1) & 1 \\ OPD(2)^2 & OPD(2) & 1 \\ \vdots & \vdots & \vdots \\ OPD(n)^2 & OPD(n) & 1 \end{pmatrix} \begin{pmatrix} p_2 \\ p_1 \\ p_0 \end{pmatrix} = \begin{pmatrix} rumMean(1) \\ rumMean(2) \\ \vdots \\ rumMean(n) \end{pmatrix}$$

to obtain the coefficients $p_0$, $p_1$, $p_2$ of the signal that are connected to gain and the mean value. The polynomial fit can have any degree, but relatively lower degrees (e.g., second, third, fourth) are preferred to avoid overfitting.

Once the coefficients of the fit are obtained, the signal can be transformed to a processed form by subtracting the average and dividing by the polynomial values.

The signal or, more preferably, the processed signal is then optionally and preferably interpolated. For example, by FFT interpolation with zero padding:

InverseDFT([DFT (Segment), zeros])

where [DFT(Segment), zeros] is a concatenation of the DFT of the signal with zero padding. Typically the interpolation is selected to make each signal several times (e.g., 2 to 10 times) denser.

Optionally and preferably, cross correlation or cross covariance is applied between the signals so at to search for spectral shifts. In embodiments in which the signal is interpolated, the cross-correlation is applied to the interpolated versions of the signal. The cross-correlation (CC) finds the best fit between signals' overlay:

$$CC(n) = \sum_{m \in (-C,+C)} segmentOverlay1[m]segmentOverLay[m+n],$$

where C is a preselected cross-correlation boundary parameter. This expression can be used to find, within the range [−C,+C] the value of the shift n that maximizes the value of CC, thus ensuring the best fit for the signals' overlay. This calculation is optionally and preferably executed for each of the K signals.

In some embodiments of the present invention the signals are interpolated so as to provide a generally constant (e.g., with tolerance of less than 10% or less than 5% or less than 1%) OPD gaps within the signal. This can be done by linear interpolation.

It was found by the inventors that the use of FFT interpolation, following by cross-correlation calculation and linear interpolation is advantageous since it solves the problem of OPD shifts in the signals. The resulting signals can then be concatenated to provide a concatenated signal that is indicative of an interferogram that is longer than each of the interferograms that are described by the individual signals.

The multipass optical cell employed by the interferometer of the present embodiments allows achieving, for example, a resolution of a traditional FTIR spectrometer having a 1 meter optical arm, using an interferometer with a 20 cm optical arm. The multipass optical cell allows providing very long effective arm lengths. Another advantage of the system of the present embodiments is that the precision of the moving parts can be maintained over generally small travelling distances, since the dimensions of the multipass optical cell are small.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Computer Simulations

FIGS. 5A-D show computer simulation results of various signals with variable spectral separation between two-peak spectral notches. The original synthetic signal is marked "original". The signal without concatenation is marked "no concatenation". The concatenated signal is marked "concatenated". In this Example, the terms "concatenation" and "stitching" are used interchangeably. The simulations were executed with N=12, and K=500,000.

Figure 5A:
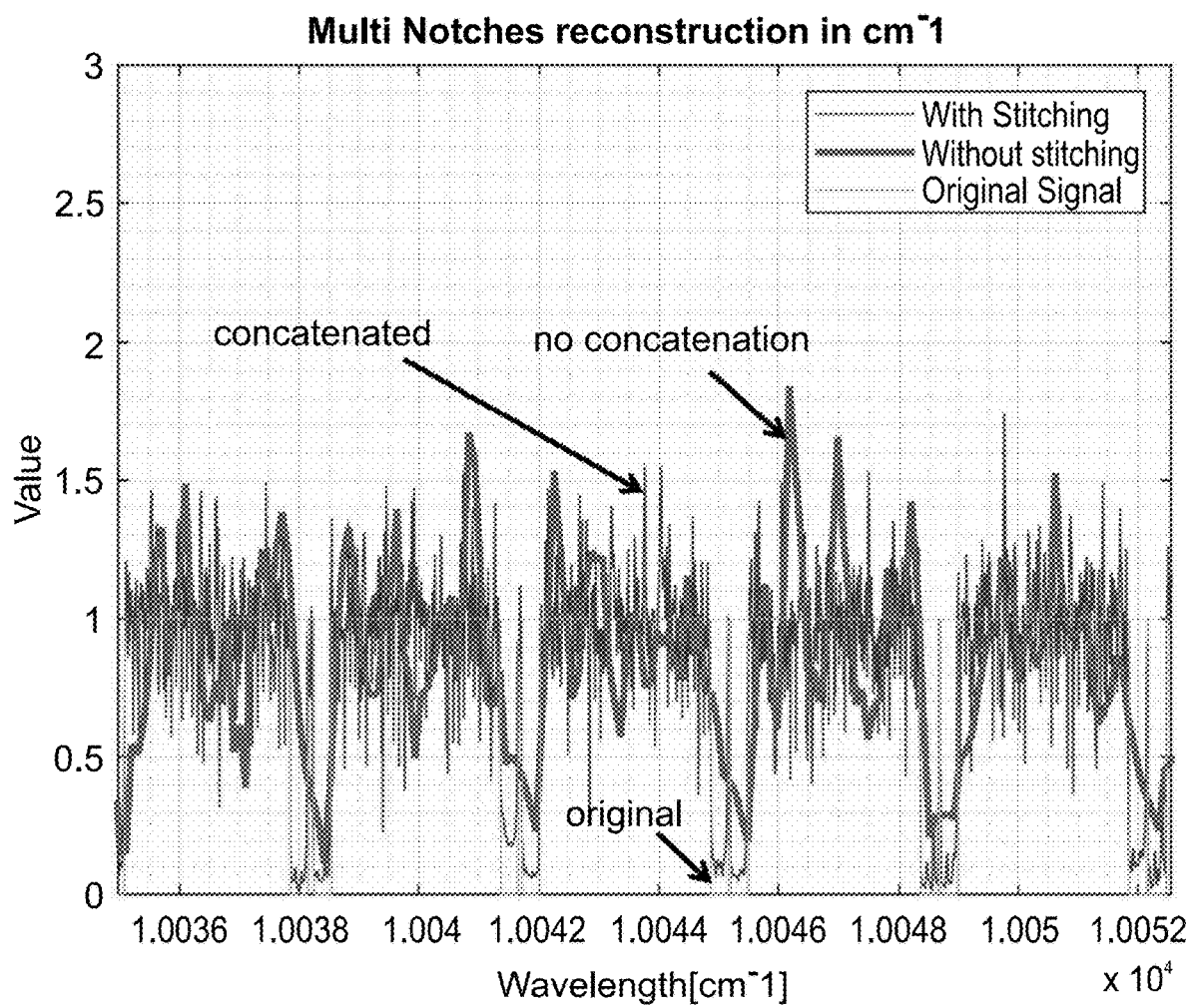
FIGS. 5A-D show computer simulation results of various signals with variable spectral separation between two-peak spectral notches, as obtained during experiments performed according to some embodiments of the present invention.
Figure 5B:
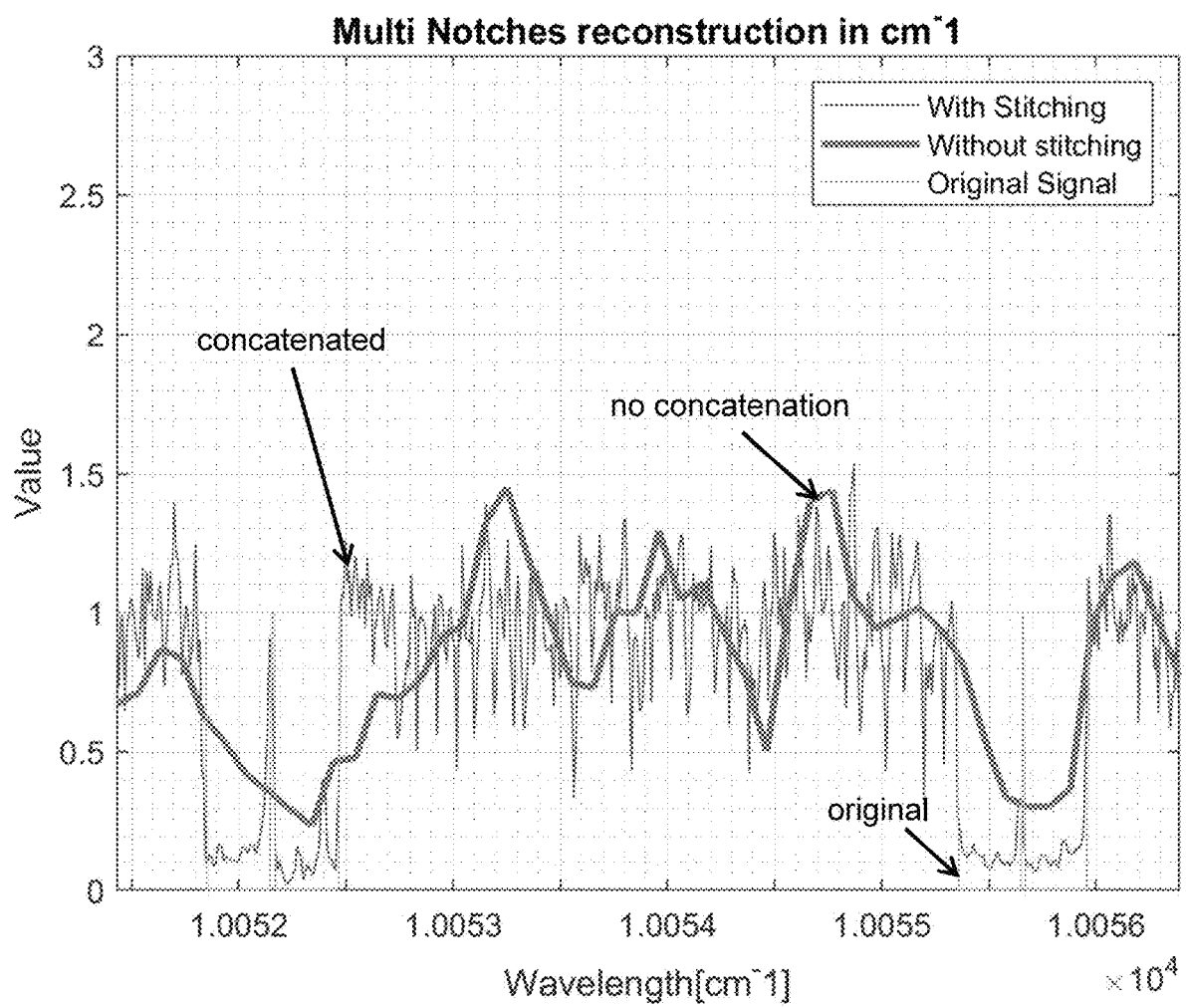
Figure 5C:
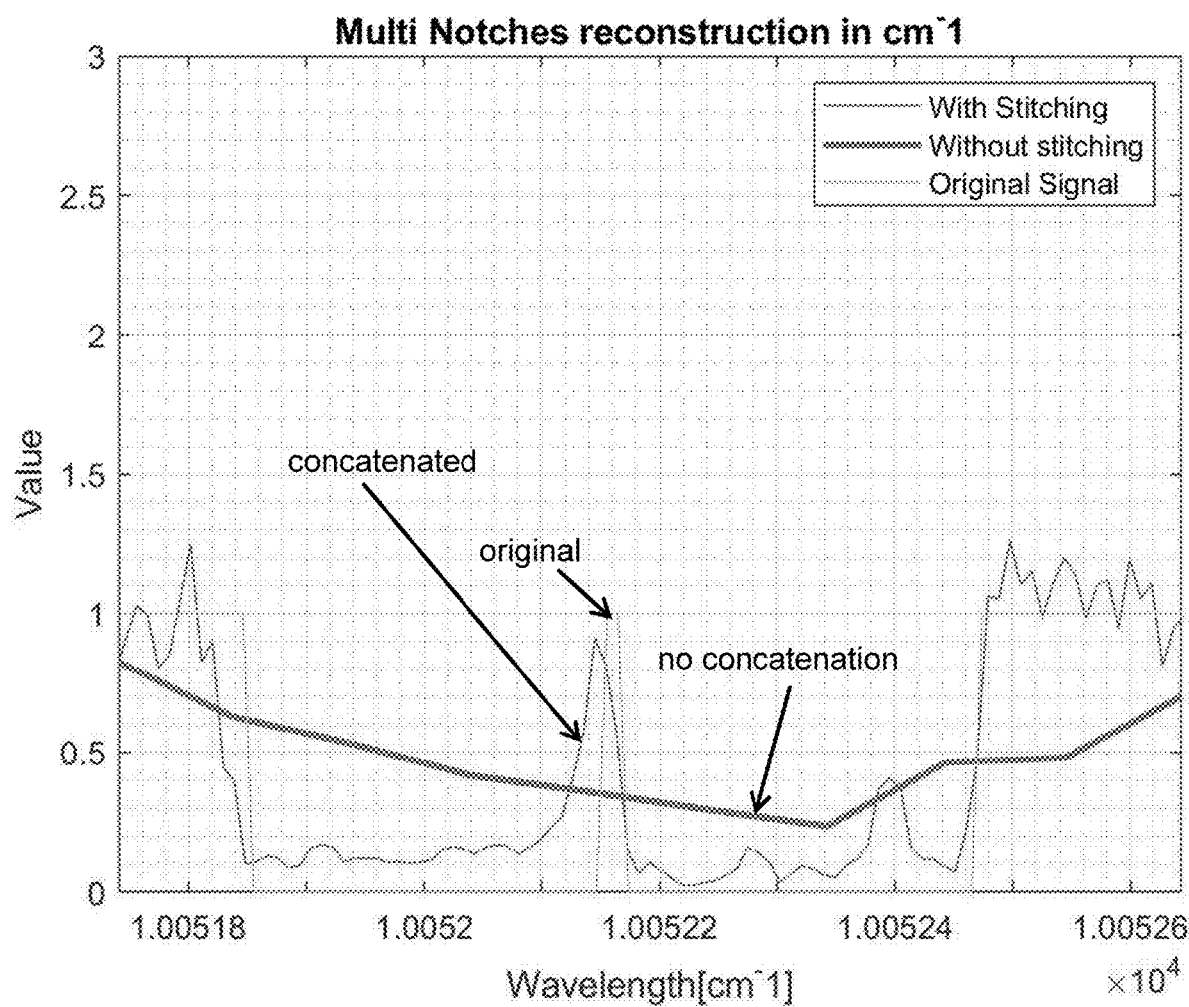

In FIGS. 5A-C, a harsh value of 50% contrast was used to indicate a good separation between notches. FIG. 5A shows that as the separation become closer and closer the signal without concatenation does not have the required resolution to observe the peaks. In contrast, the concatenated signal recovers all the two-peaks. FIG. 5B is a zoom-in illustration of the last noticeable notches. As shown, the occurrence at the right hand side of FIG. 5B has separation of less than 50%, and the occurrence at the left hand side of FIG. 5B is has a separation of about 50%. Whereas the non-concatenated signal, only detects a single peak, the concatenated signal always show separation between the peaks.

FIG. 5C is a further zoom-in illustration of the right hand side peaks. As shown there is resolution of about 0.025[cm$^{-1}$] for the concatenated signal, which is an order of magnitude better that the original signal.

Figure 5D:
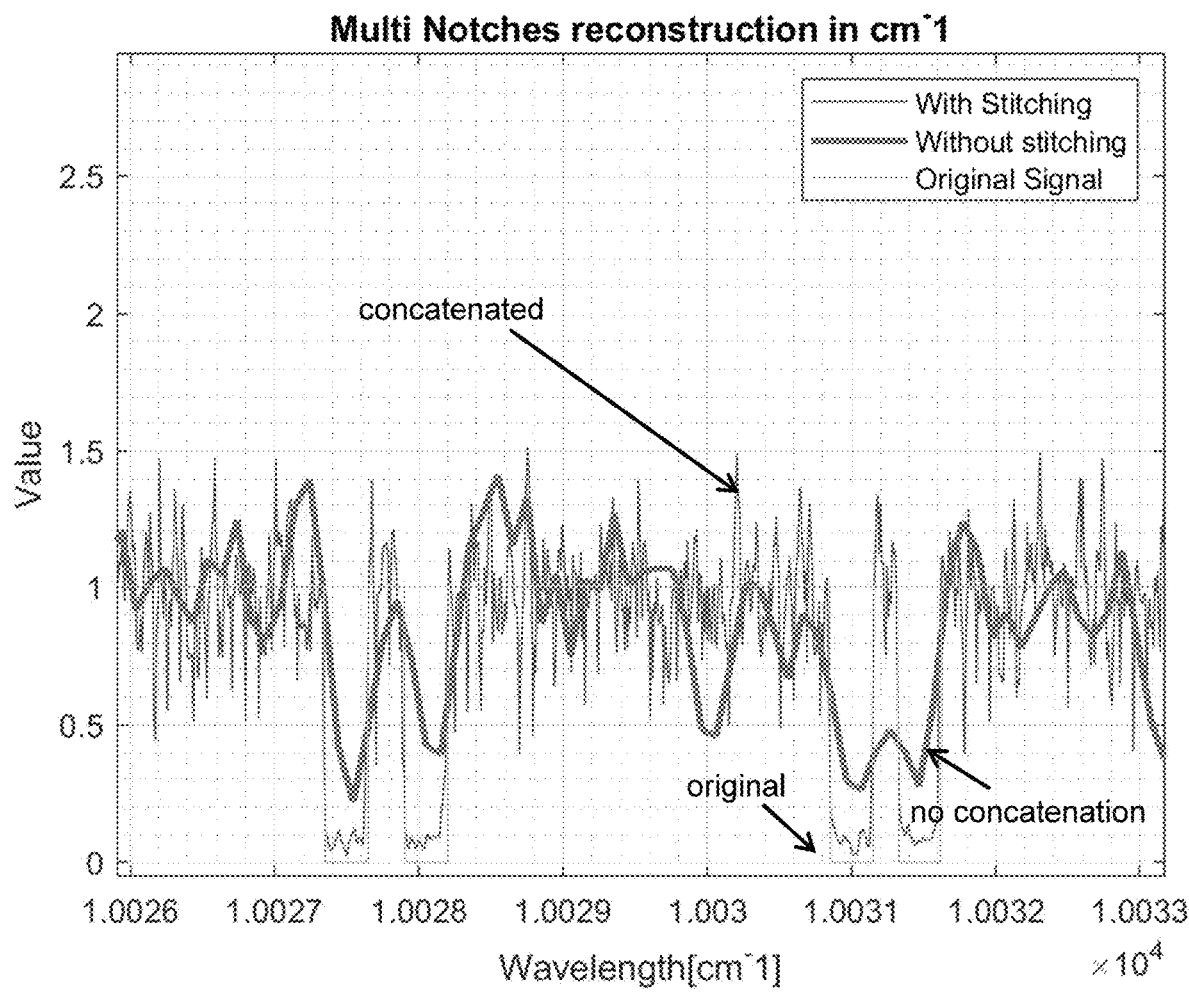

FIG. 5D shows simulation results for the case of contrast above 50%. As shown, the non-concatenated signal has a maximal resolution of about 0.25 [cm$^{-1}$], demonstrating that the system of the present embodiments is capable of improving the resolution by an order of magnitude for N=12 optical path modes of cell 60 for the case of contrast of more than 50%.

Example 2

Herriot Cell Considerations

The Inventors found that a Herriott cell can be implemented as a long varying delay line for an FTIR spectrometer system. Embedding a Herriott cell in the stationary arm of the FTIR and operating it in a multi-mode fashion can push the theoretical resolution limit of the FTIR while maintaining small footprint. Denoting the cell's modes with index H, the mode's OPD can be sorted from low to high:

$$L_{H+1} > L_H > d_H \quad (3.1)$$

The Herriott FTIR total OPD can be written as:

$$\vec{D}_{total} = \sum_{H=1}^{H_{max}} (L_H + \vec{D}) \quad (3.2)$$

Where D is the OPD of the delay arm and $d_H$ is the cell size for mode H.

Figure 6:
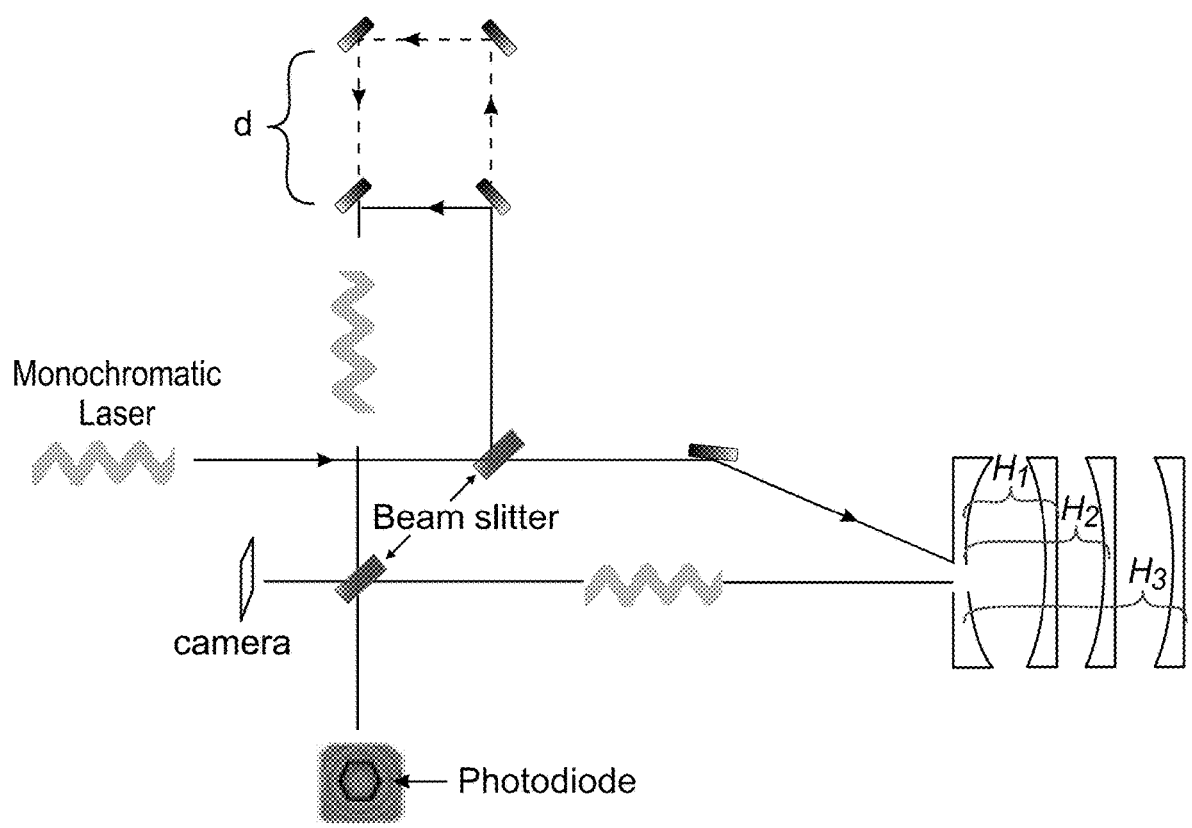
FIG. 6 is a schematic illustration of an experimental setup used in experiments performed according to some embodiments of the present invention.

This Example describes a proof of concept experiment that included a measurement of a monochromatic light with a Herriott FTIR. The experimental setup is illustrated in FIG. 6. The spectral function of a monochromatic light is a delta function. Therefore, the FWHM of the spectral line that was measured for a monochromatic light was the minimal resolution of the system. Testing the concatenation procedure included a reference signal, which was a FTIR measurement with a single Herriott mode as a stationary arm and a full scan of the delay arm.

The experiment included a partial scan of the delay arm d for different Herriott cell modes, so that the sum of all the Herriott FTIR signals was equal to the reference signal.

$$\vec{D} = \sum_{H=1}^{H_{max}} (L_H + \vec{d}) \quad (3.3)$$

An FTIR measurement typically obtains a spectrum by Fourier transforming an interferogram. Since the amplitude of the Herriott cell output beam is dependent of the mode, each Herriott FTIR signal has a different amplitude around a different mean value. The starting points of the signals are the OPDs of the Herriott cell modes. The difference between two Herriott cell mode OPDs $\Delta L = |L_2 - L_1|$ is not necessarily consistent with the sampling frequency of the delay arm $\delta d$.

$$\Delta L \neq N \delta d \quad (3.4)$$

Where N is an integer.

The phase accumulated in the Herriott cell is dependent of the mode, and so the phase of the total interferogram does not change continuously.

$$\chi_k = k(L + \phi_\sigma) \quad (3.5)$$

Where $\chi_k$ is the phase accumulated in the Herriott cell for wavenumber k, L is the OPD of the Herriott cell mode σ and $\phi_\sigma$ is the mode dependent phase.

Additionally, the Herriott cell can create distortion in the spectral distribution.

In the present example, a signal processing procedure was used to concatenate the signals, while attempting to provide an interferogram with a generally continuous amplitude, a generally constant sampling frequency, a generally continuous phase, and a consistent spectrum distribution under Fourier transform. The procedure included global processing, signal concatenation, and spectrum correction.

The global processing included preparation of the signals for concatenation by setting the signal Herriott FTIR amplitude to one and mean value to zero and sorting the signals according to their OPD.

The signal concatenation operation used the overlapping OPD sections of two adjacent signals as a reference signal for the continuity of the sampling frequency and phase of the total interferogram. This was executed in an iterative manner that gradually matched the sampling and phase of the signals to the smallest OPD signal. At each iteration the two smallest OPD signals were compared, the smallest OPD is referred to in this example as the first signal and its adjacent is referred to in this example as the second signal.

The sampling start positions were matched by interpolating the second signal to a desired OPD that fulfils the requirement $\Delta L = N\delta d$. This was done by finding the start data point at the signal OPD, $x_1$, that correspond to the starting point of the second signal OPD, $x_2$:

$$x_1 - x_2 = \delta x \leq \delta d \tag{3.6}$$

The second signal OPD was then shifted to the first signal OPD, the interferogram of the second signal $I_2(x)$ to match the new OPD using Shape-Preserving Piecewise Cubic Interpolation.

The mode dependent phase was treated as a constant spatial phase shift for each mode. Cross-correlation or cross-covariance of signals was used to find a constant time delay between two signals that overlap in time or space. A cross-correlation of two signals f(t) and g(t) can be written as:

$$(f \star g)(\tau) = \int_{-\infty}^{\infty} f^*(t)g(t+\tau)dt \tag{3.7}$$

The Herriott FTIR signals are all identical signals that differ in space by the Herriott mode OPD L and phase $\phi_\sigma$. For the combination of the signals it is desired to preserve the mode's OPD and eliminate or reduce the mode's phase. This was done by selecting the Herriott cell modes that have a small overlapping section between them such that:

$$L_{H+1} = L_H + D - \delta \tag{3.8}$$

Where D is the length of the delay arm and $\delta$ is the length of the overlapping section. At the overlapping section, the interferograms of both signals is generally the same, up to the mode phase difference $\Delta\phi_\sigma$:

$$\tilde{I}_{H+1} = \tilde{I}_H e^{-i\vec{k}\Delta\phi_{H,H+1}} \tag{3.9}$$

To conserve the phase the procedure searched for relative phase between two adjacent signals by finding the maximal value of the cross-correlation function. The second signal was shifted to match the first signal by adjusting its OPD:

$$L_{H+1} \rightarrow L_{H+1} + \Delta\phi_{H,H+1} \tag{3.10}$$

Figure 7A:
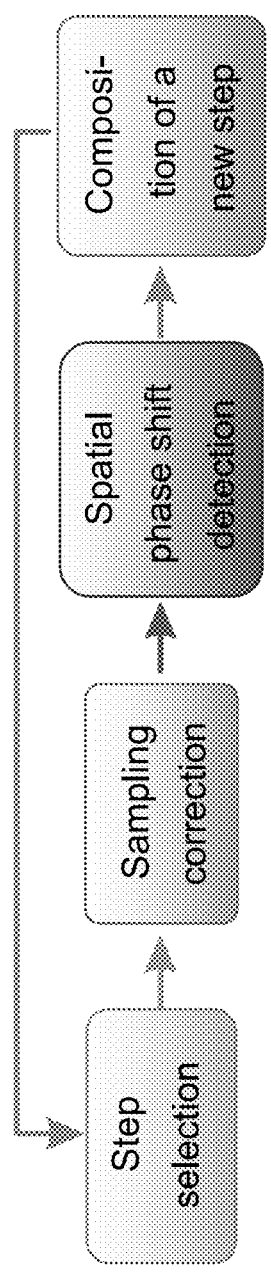
FIGS. 7A-D show a signal concatenation operation according to some embodiments of the present invention.
Figure 7B:
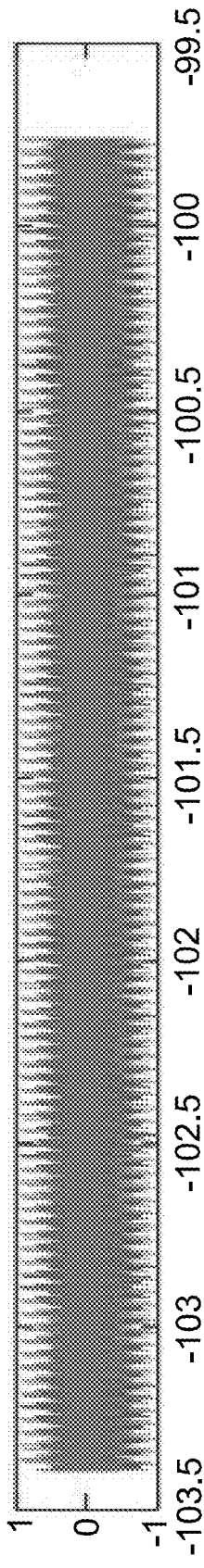
Figure 7C:
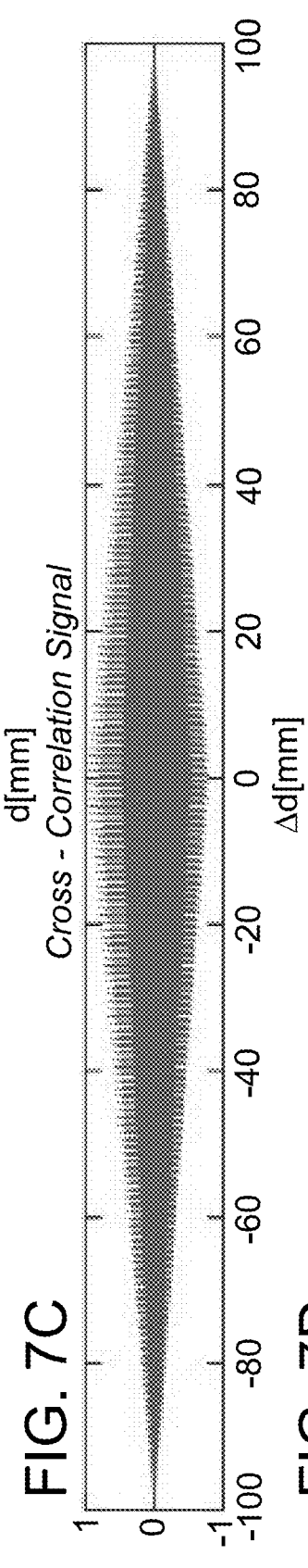
Figure 7D:
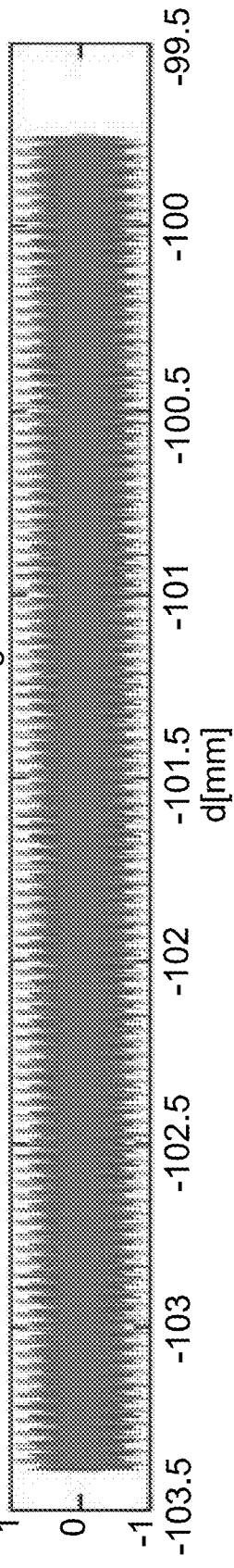

The signals were then combined to form a new longer signal, which were then used as the first signal in the next iteration. The procedure is illustrated in FIGS. 7A-D, where FIG. 7A is a flowchart of the signal concatenation operation, and FIGS. 7B, 7C and 7D show the overlapping part of the signals, the cross-correlation, and the corrected interferograms, respectively. In FIGS. 7B and 7D, the first signal is shown in dark gray and the second signal is shown in bright gray.

Spectrum correction was done by multiplying the spectrum with the inverse spectral amplitude of the modes received by calibration:

$$\tilde{S}(k) = S(k)\tilde{A}^{-1}(k) \tag{3.11}$$

In the present example, the Herriott cell was calibrated to be consistent with the scanning arm resolution. This was done using short pulse autocorrelation. In this process, the input light was a short pulse Gaussian beam centered around wavelength $\lambda$.

Figure 8:
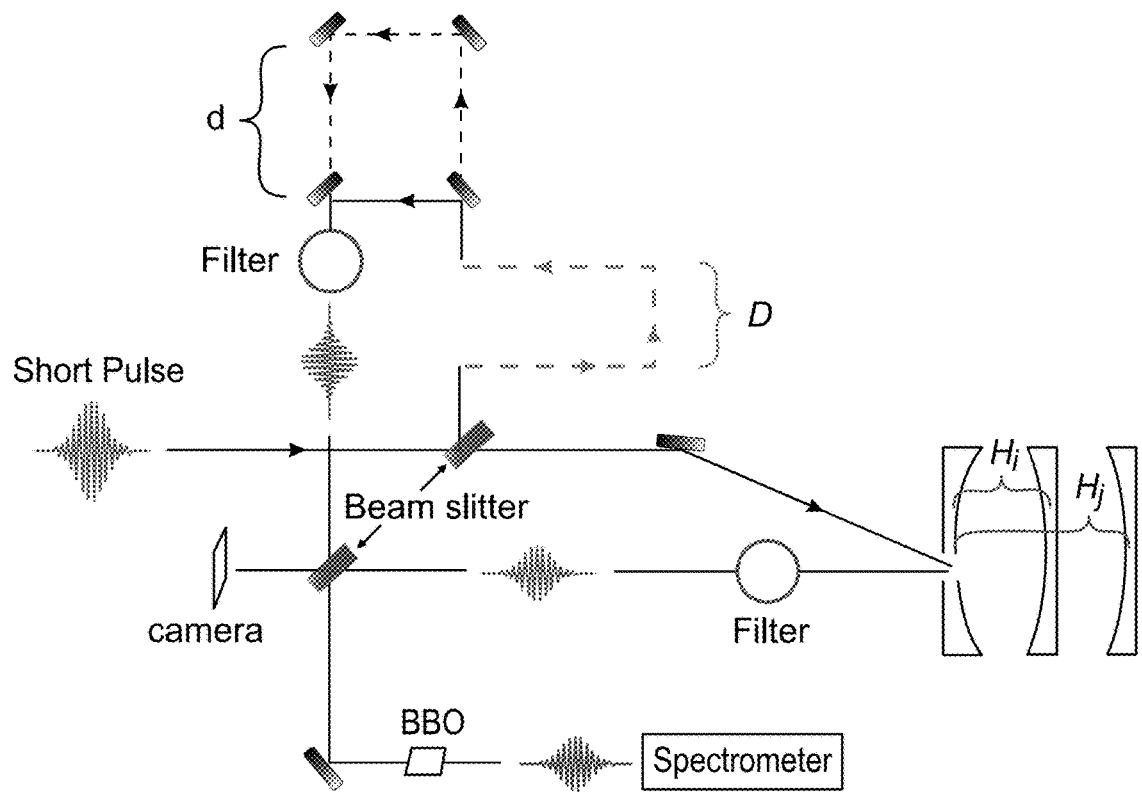
FIG. 8 is a schematic illustration of an experimental setup used according to some embodiments of the present invention for calibrating a Herriott cell.

The experimental setup for the calibration of the Herriott cell is illustrated in FIG. 8. Once the beam was split, it passed through two different wavelength filters. One of the arms was low pass filtered allowing only wavelengths shorter than the center wavelength, and the other arm was high pass filtered allowing only wavelengths longer than the center wavelength. When the beams were recombined at the second beam-splitter they passed through a BBO crystal cut to SHG of the centered wavelength and measured with a spectrometer.

The spectrum measured at the spectrometer is expected to contain both fundamental and SHG of both arms for any OPD, and the SFG of the beams only for OPD which is approximately zero. A camera was positioned at the second recombination of the beams. The camera was used to confirm the mode selection and system alignment.

Figure 9:
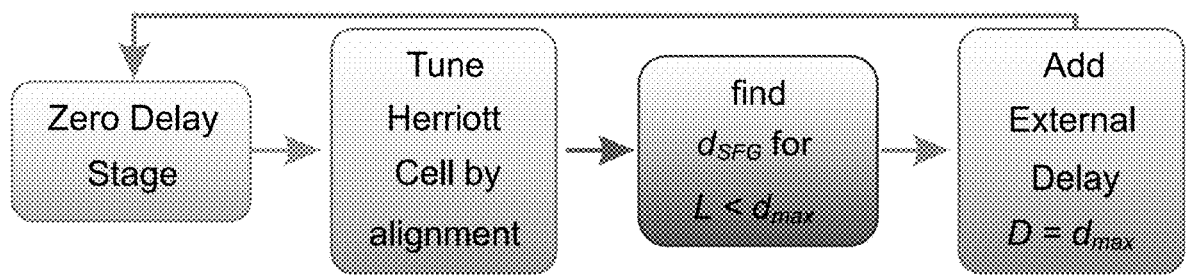
FIG. 9 is a flowchart describing a calibration process, according to some embodiments of the present invention.

The calibration process was able to calibrate modes for $L \leq d_{max}$. To allow calibration also for other values of L, the calibration sequence was split to sets of calibration iterations. At each calibration iteration the delay arm was maximize, then a fixed arm of length $D = d_{max}$ was added to the delay arm. Extensions were zeroed by a second pulse-autocorrelation in order to validate the real d=0 of the delay arm as presented at the flow chart shown in FIG. 9.

The OPD of a mode was determined by setting the SFG signal to a Gaussian distribution in space $$I = I_0 e^{-\frac{(d-L)^2}{2\Delta L^2}} \tag{3.12}$$

where the center L is the OPD value of the mode and the FWHM $\Delta L$ is the measurement error. The process was executed several times for each mode and was shown to be repeatable up to the measurement error. An example of the results for one of the measurements is a three mode Herriott FTIR as presented in Table 1.

TABLE 1

| Mode($\sigma$) | Cell Size [mm] | OPD [mm] |
| --- | --- | --- |
| 7 | 35 | 127.7281 ± 0.1708 |
| 6 | 50 | 221.5103 ± 0:1871 |
| 5 | 75 | 342.2696 ± 0.1794 |

Computer Simulations

Figure 10A:
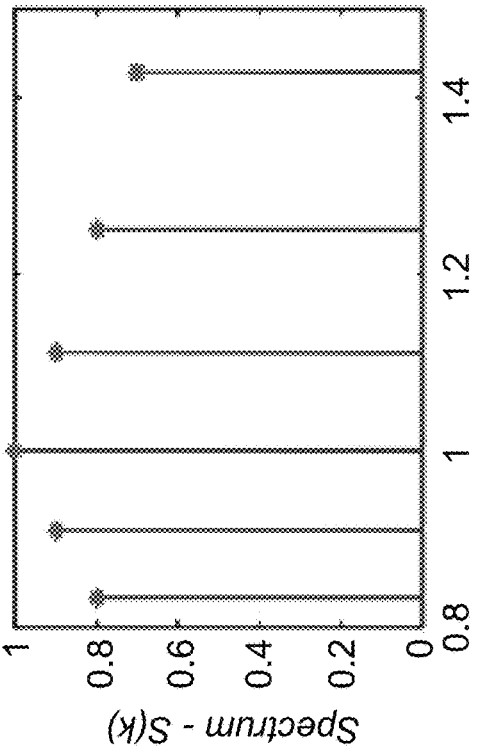
FIGS. 10A-D show re-contraction of FTIR simulation for polychromatic light, as obtained in experiments performed according to some embodiments of the present invention.
Figure 10B:
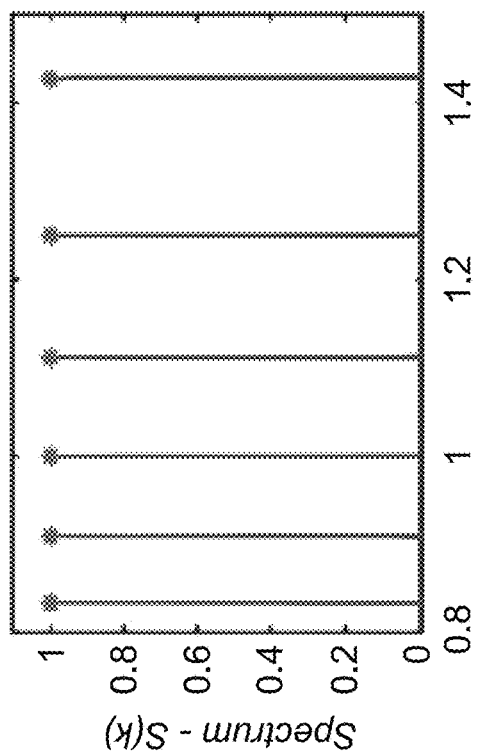
Figure 10C:
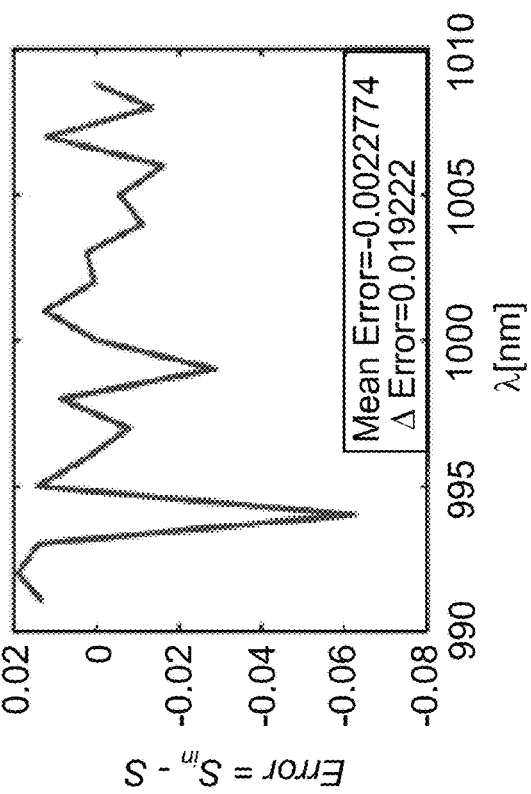
Figure 10D:
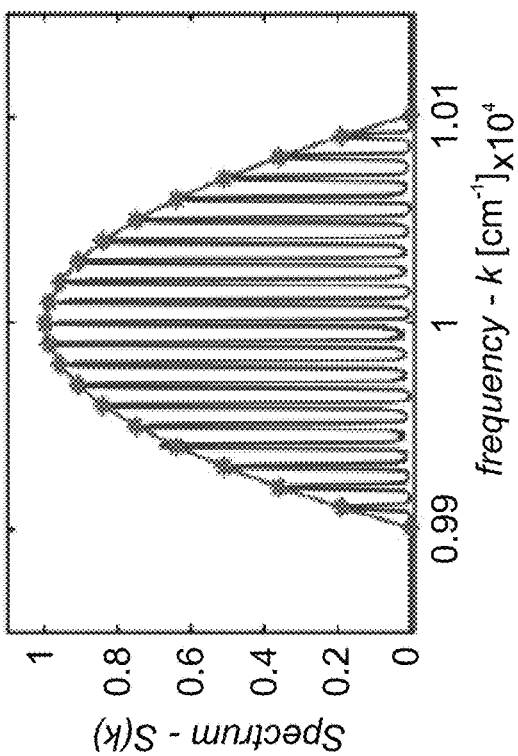

FIGS. 10A-D show re-contraction test of the FTIR simulation for poly chromatic light. FIG. 10A presents reconstruction of polychromatic light with constant amplitude S(k)=1, FIG. 10B presents polychromatic light with wavelength dependent amplitude S(k) (wide frequency range: 700-1200 nm), and FIG. 10C presents polychromatic light with wavelength dependent amplitude S(k) (narrow frequency range: 990-1010 nm). The difference between the input and output amplitudes is presented as variable Error=$S_{in}$(k)−S(k) in FIG. 10D.

FIGS. 10A-D demonstrate that the FTIR simulation of the present embodiments is a good representation of a FTIR optical system, by showing that it successfully reconstructs the spectrum of an input polychromatic light and is consistent with the theoretical resolution limit.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of analyzing a light beam, comprising:
passing the light beam through an interferometer system;
wherein said interferometer system comprises:
a light redirecting system for splitting an input light beam into two secondary light beams to respectively propagate along a first optical arm and a second optical arm, and for recombining said secondary light beams to a combined beam after exiting said optical arms;
a light detector for receiving said combined beam and generating a signal indicative of an interference pattern encoded in said combined beam; and
a multipass optical cell positioned at said second optical arm and being configurable to effect a predetermined optical path length within said second arm; and
analyzing an output of said light detector;
wherein the method further comprises reconfiguring said multipass optical cell to effect a different predetermined optical path length within said second arm, and wherein said analyzing said output comprises combining signals corresponding to different optical path length ranges within said second arm.

2. The method of claim 1, wherein said multipass optical cell is selected from the group consisting of a Herriott cell and a White cell.

3. The method according to claim 1, wherein said first optical arm is configured to scan an optical path difference between said predetermined optical path length and an optical path length of said first optical arm.

4. The method according to claim 1, wherein optical arms and light redirecting system are arranged to form an interferometer selected from the group consisting of a Michelson interferometer, a Sagnac interferometer, a Mach-Zehnder interferometer, and a Polarimetric interferometer.

5. The method of claim 1, wherein said interferometer system is an FTIR spectrometer system.

6. The method of claim 1, wherein said combining said signals comprises matching phase shifts between said signals, and concatenating said signals at said matched phase shifts.

7. The method of claim 6, wherein said phase shifts comprise spatial phase shifts.

8. The method according to claim 6, wherein said phase shifts comprise spectral phase shifts.

9. The method according to claim 1, wherein said combining said signals comprises adjusting amplitudes of said signals.

10. The method according to claim 1, wherein said combining said signals comprises sorting said signals according to said optical path length ranges, to provide an ordered list of signals, and iteratively combining each signal of said ordered list to an adjacent signal of said list.

11. The method according to claim 10, further comprising re-arranging said list such as to ensure overlapping optical path length ranges among at least two adjacent signals of said list.

12. The method according to claim 1, wherein said light beam comprises infrared light.

13. The method according to claim 1, wherein said light beam comprises visible light.

14. A spectrometer system, comprising:
a light redirecting system for splitting an input light beam into two secondary light beams to respectively propagate along a first optical arm and a second optical arm, and for recombining said secondary light beams to a combined beam after exiting said optical arms;
wherein said second optical arm is configurable to assume a state selected from a set of states, each state corresponding to a different path length within said second arm; and
wherein said first optical arm is configured to scan, for each state of said second optical arm, an optical path difference between an optical path length of said first arm and an optical path length corresponding to said state of said second optical arm.

15. The system according to claim 14, wherein said optical arms and said light redirecting system are arranged to form an interferometer selected from the group consisting of a Michelson interferometer, a Sagnac interferometer, a Mach-Zehnder interferometer, and a Polarimetric interferometer.

16. The system according to claim 14, further comprising a light detector for receiving said combined beam and generating a signal indicative of an interference pattern encoded in said combined beam.

17. The system according to claim 16, further comprising a signal processor configured for receiving from said light detector a plurality of time-varying signals, each corresponding to a scan of said first optical arm for a different state of said second optical arm, and combining said signals.

* * * * *